United States Patent
Sumanth

(10) Patent No.: US 12,456,554 B1
(45) Date of Patent: Oct. 28, 2025

(54) 5G NETWORK SLICING CONNECTIONS IN A HEALTHCARE MANAGEMENT SYSTEM

(71) Applicant: T-Mobile USA, Inc., Bellevue, WA (US)

(72) Inventor: Shrustishree Sumanth, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 14 days.

(21) Appl. No.: 18/639,840

(22) Filed: Apr. 18, 2024

(51) Int. Cl.
*G16H 80/00* (2018.01)
*G16H 40/20* (2018.01)
*G16H 40/67* (2018.01)
*H04W 28/20* (2009.01)
*H04W 76/10* (2018.01)

(52) U.S. Cl.
CPC ............ *G16H 80/00* (2018.01); *G16H 40/20* (2018.01); *G16H 40/67* (2018.01); *H04W 28/20* (2013.01); *H04W 76/10* (2018.02)

(58) Field of Classification Search
None
See application file for complete search history.

(56) References Cited

U.S. PATENT DOCUMENTS

| | | | |
|---|---|---|---|
| 7,248,688 B2 | 7/2007 | Wellons et al. | |
| 7,376,836 B2 | 5/2008 | Graves et al. | |
| 7,440,567 B2 | 10/2008 | Wellons et al. | |
| 7,676,380 B2 | 3/2010 | Graves et al. | |
| 9,251,313 B2 | 2/2016 | Ross et al. | |
| 9,264,664 B2* | 2/2016 | Pinter | H04N 7/148 |
| 9,819,650 B2 | 11/2017 | Soon-Shiong et al. | |
| 9,955,310 B2 | 4/2018 | Venkat et al. | |
| 11,030,666 B2 | 6/2021 | Ketchel et al. | |
| 11,126,696 B1* | 9/2021 | Srivastava | G16H 40/20 |
| 11,205,510 B2 | 12/2021 | Ross et al. | |
| 11,270,795 B2 | 3/2022 | Mason et al. | |
| 11,411,840 B2* | 8/2022 | Cioffi | G06Q 10/103 |
| 11,636,944 B2 | 4/2023 | Hanrahan et al. | |
| 11,785,047 B2 | 10/2023 | Weiler et al. | |
| 12,143,282 B2* | 11/2024 | Kanagarathinam | H04M 7/0081 |

(Continued)

FOREIGN PATENT DOCUMENTS

| | | |
|---|---|---|
| CN | 1297923 C | 1/2007 |
| CN | 103379494 B | 11/2016 |

(Continued)

*Primary Examiner* — Jason S Tiedeman
(74) *Attorney, Agent, or Firm* — Perkins Coie LLP

(57) ABSTRACT

A server system associated with a 5G telecommunications network receives a first request to schedule a healthcare session from a first device. The healthcare session can be between the first device and a second device. The first request can be received from a software application operating on the first device. The first request can indicate a type of the healthcare session selected from multiple healthcare session types and a scheduled time for the healthcare session. The server system can determine a bandwidth allocation for a network slice of the 5G telecommunications network required for conducting the healthcare session based on the type of the healthcare session and the scheduled time. The server system can establish a 5G wireless connection between the first device and the second device through the network slice at the time of the scheduled healthcare session.

19 Claims, 7 Drawing Sheets

(56) References Cited

U.S. PATENT DOCUMENTS

| | | | |
|---|---|---|---|
| 2005/0063420 A1 | 3/2005 | Graves | |
| 2006/0224048 A1* | 10/2006 | Devaul | A61B 5/411 128/903 |
| 2009/0213847 A1 | 8/2009 | Graves | |
| 2010/0063835 A1* | 3/2010 | Kenedy | G16B 50/00 705/2 |
| 2010/0063930 A1* | 3/2010 | Kenedy | G06Q 20/3674 705/51 |
| 2012/0144336 A1* | 6/2012 | Pinter | H04N 7/148 709/224 |
| 2015/0127381 A1* | 5/2015 | Vo | G16H 40/67 705/3 |
| 2016/0026769 A1 | 1/2016 | Williams et al. | |
| 2016/0042135 A1* | 2/2016 | Hogan | G16Z 99/00 705/2 |
| 2017/0054595 A1* | 2/2017 | Zhang | H04L 41/0897 |
| 2018/0027351 A1* | 1/2018 | Cartwright | H04M 3/56 381/303 |
| 2018/0122497 A1* | 5/2018 | Pietronigro | G16H 10/20 |
| 2019/0110207 A1* | 4/2019 | Makhijani | H04W 28/16 |
| 2019/0139648 A1* | 5/2019 | Rutledge | G16H 50/30 |
| 2020/0259896 A1* | 8/2020 | Sachs | H04L 67/12 |
| 2021/0020305 A1 | 1/2021 | Ray | |
| 2021/0118558 A1 | 4/2021 | Matcham | |
| 2021/0398668 A1 | 12/2021 | Chock et al. | |
| 2021/0407665 A1* | 12/2021 | Simha | G16H 10/60 |
| 2022/0039109 A1* | 2/2022 | Shaw | H04L 47/826 |
| 2022/0059216 A1 | 2/2022 | Lewis | |
| 2022/0060943 A1* | 2/2022 | Soleil | H04M 15/8044 |
| 2022/0104305 A1* | 3/2022 | Guionnet | H04L 67/51 |
| 2022/0115118 A1 | 4/2022 | Ross et al. | |
| 2022/0148725 A1* | 5/2022 | Mason | G16H 20/30 |
| 2022/0301699 A1* | 9/2022 | Crockett | G16H 40/20 |
| 2022/0328180 A1* | 10/2022 | Chelles | G16H 40/67 |
| 2022/0361810 A1* | 11/2022 | Price | A61B 5/7405 |
| 2022/0384060 A1* | 12/2022 | Valles Leon | G16H 80/00 |
| 2023/0005610 A1* | 1/2023 | Shrivastava | A61B 34/74 |
| 2023/0074003 A1* | 3/2023 | Trim | G16H 10/60 |
| 2023/0112918 A1* | 4/2023 | Borhade | G06F 16/24573 707/741 |
| 2023/0277261 A1* | 9/2023 | Roh | G16H 20/40 700/2 |
| 2023/0307147 A1* | 9/2023 | McGuire | G16H 40/20 |
| 2024/0177085 A1* | 5/2024 | Sternberg | G06Q 10/063112 |
| 2024/0358599 A1* | 10/2024 | Roberts | A61J 7/0436 |
| 2024/0388540 A1* | 11/2024 | Bush | H04L 47/28 |
| 2024/0401834 A1* | 12/2024 | Ranajee | G05B 15/02 |

FOREIGN PATENT DOCUMENTS

| | | | |
|---|---|---|---|
| CN | 109147915 A | 1/2019 | |
| CN | 107333013 B | 8/2020 | |
| CN | 112005316 A | 11/2020 | |
| CN | 112334879 A | 2/2021 | |
| CN | 107113294 B | 7/2021 | |
| CN | 109688909 B | 7/2022 | |
| CN | 108733460 B | 11/2022 | |
| CN | 110046186 B | 7/2023 | |
| DE | 10137430 A1 | 2/2003 | |
| DE | 202005021207 U1 | 10/2007 | |
| DE | 112012003056 T5 | 4/2014 | |
| EP | 2683994 A2 | 1/2014 | |
| EP | 2973368 A1 | 1/2016 | |
| EP | 2984619 A1 | 2/2016 | |
| EP | 3195246 A2 | 7/2017 | |
| EP | 2992500 B1 | 12/2018 | |
| EP | 3414689 A1 | 12/2018 | |
| EP | 2748804 B1 | 9/2019 | |
| EP | 3278504 * | 4/2020 | H04L 12/24 |
| EP | 3740953 A1 | 11/2020 | |
| EP | 3462457 B1 | 5/2021 | |
| EP | 3489958 B1 | 3/2022 | |
| JP | 2005514808 A | 5/2005 | |
| JP | 3993445 B2 | 8/2007 | |
| JP | 2010509681 A | 3/2010 | |
| JP | 4999687 B2 | 5/2012 | |
| JP | 5937207 B2 | 5/2016 | |
| JP | 6253166 B2 | 12/2017 | |
| JP | 6515920 B2 | 4/2019 | |
| JP | 7224288 B2 | 2/2023 | |
| JP | 7441786 B2 | 3/2024 | |
| KR | 20030022123 A | 3/2003 | |
| KR | 20060045404 A | 5/2006 | |
| KR | 20080035364 A | 4/2008 | |
| KR | 20100015420 A | 2/2010 | |
| KR | 101614710 B1 | 4/2016 | |
| KR | 20170055484 A | 5/2017 | |
| KR | 20180088073 A | 8/2018 | |
| KR | 20190102060 A | 9/2019 | |
| KR | 102027929 B1 | 10/2019 | |
| KR | 102500968 B1 | 2/2023 | |
| WO | 0101321 A1 | 1/2001 | |
| WO | 2012122065 A1 | 9/2012 | |
| WO | 2014015697 A1 | 1/2014 | |
| WO | 2014100036 A1 | 6/2014 | |
| WO | 2014169024 A2 | 10/2014 | |
| WO | 2017070253 A1 | 4/2017 | |
| WO | 2019070822 A1 | 4/2019 | |
| WO | 2021258031 A1 | 12/2021 | |

* cited by examiner

5G NETWORK SLICING CONNECTIONS IN A HEALTHCARE MANAGEMENT SYSTEM

BACKGROUND

Fifth generation (5G) telecommunications wireless network (also referred to as "5G network") technology can provide fast, reliable, and secure wireless connectivity. Specifically, 5G network can provide higher speed, lower latency, enhanced connectivity, and increased capacity compared to the previous generation networks. Such properties of 5G network can be beneficial for next-generation healthcare systems by allowing patients to be diagnosed and treated remotely. Opportunities for remote healthcare can have an important role in increasing accessibility, cost-effectiveness and convenience of healthcare.

BRIEF DESCRIPTION OF THE DRAWINGS

Detailed descriptions of implementations of the present invention will be described and explained through the use of the accompanying drawings.

Figure 1:
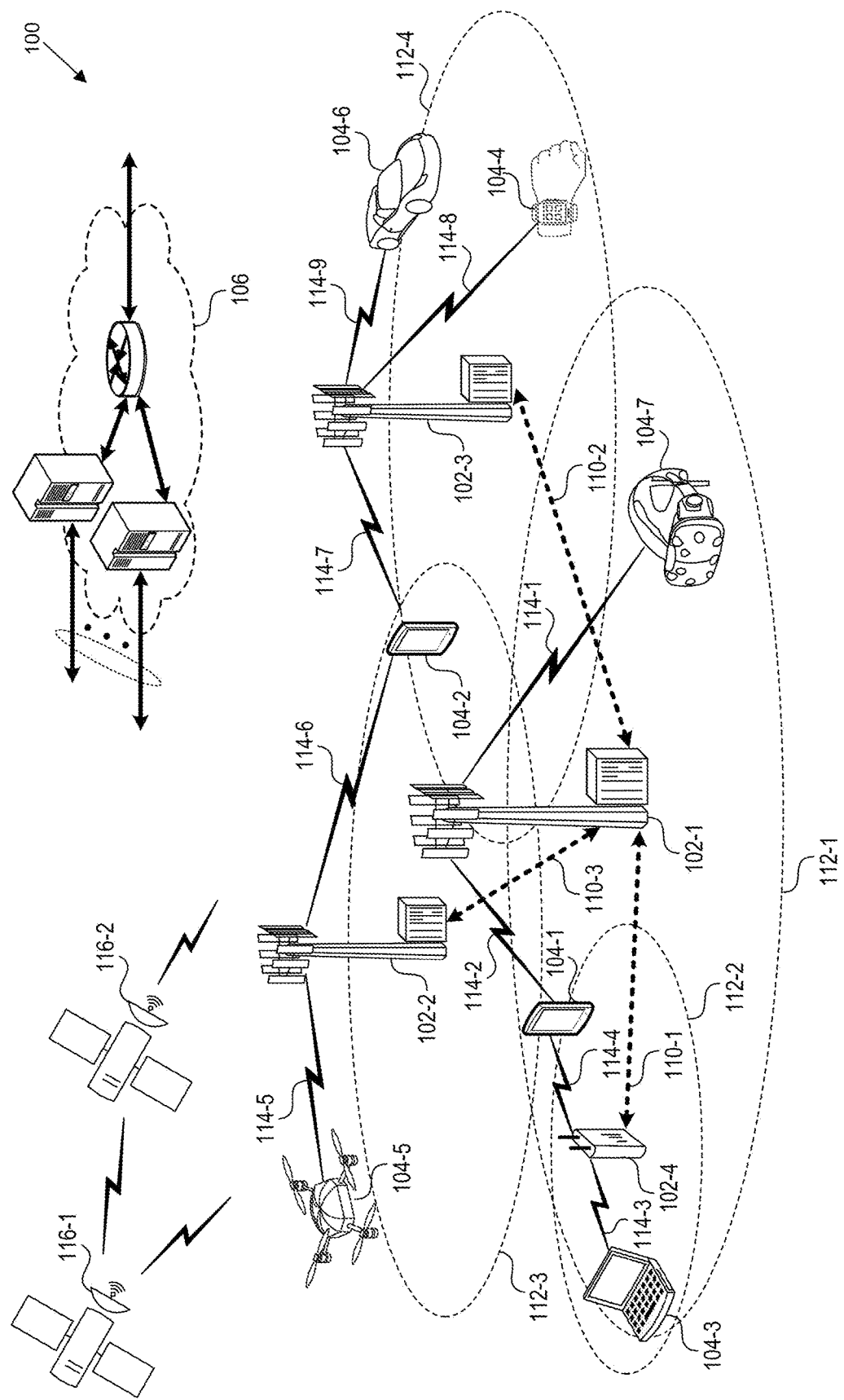
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present technology provides for 5G wireless network slicing systems and methods for applications in a healthcare environment. Network slicing is a feature of the 5G network that allows server systems to create multiple virtual networks (slices) within a single network architecture. The individual network slices in a healthcare environment can be tailored to meet requirements based on use cases, geographical locations, and times of day. Significantly, network slicing allows the allocation of network resources based on the different use cases so that all connections within a healthcare environment can operate without interruptions. For example, server systems can adjust the speed, latency, capacity, and reliability of a network slice based on the use case.

Wireless connections can provide various benefits for the operations of healthcare systems by enabling remote diagnosis and treatment of patients. The present technology provides for automated and efficient methods and systems of creating connections via 5G network slices between devices within a healthcare system for scheduled healthcare sessions. As an example, a healthcare provider schedules healthcare sessions via an application operating on a wireless device by a request sent to a server system. The healthcare session can include a robotic surgery, remote monitoring and testing of a patient, delivery of medicines or medical supplies, or a virtual doctor's appointment. The server system can assist in scheduling the healthcare session and concurrently facilitate establishing connections for the scheduled healthcare sessions via 5G network slices. The server system allocates an appropriate bandwidth for the network slices based on the requirement of the healthcare session. The present technology ensures that a connection for a healthcare session does not use more resources of the network than is needed while ensuring that the connection is reliable, secure, and meets the requirements for the healthcare session. Using the 5G network slicing providing automated and appropriate bandwidth allocation within a healthcare system can reduce the risk of connection interruptions (e.g., broken connections, or slowed down connections) and increase overall accessibility to reliable and secure connections in the healthcare system.

The disclosed server system and method can provide improved remote healthcare experience to patients by providing secure, private, and reliable network connections via the 5G network slices. Further, the concurrent scheduling and establishment of remote healthcare sessions and respective connections can reduce the time required for accessing healthcare services. The disclosed server system and method can thereby increase the effectiveness of diagnosis and treatment of patients compared to conventional, in-person diagnosis and treatment.

In one example, a server system receives a first request to schedule a healthcare session from a first device associated with a healthcare management system. The server system can be associated with a 5G telecommunications network for providing network slicing connections in the healthcare management system. The healthcare session can be between the first device and a second device associated with the healthcare management system. The healthcare session can be via the 5G telecommunications network. The first request can be received from a software application for managing healthcare sessions operating on the first device. The first request can indicate a type of the healthcare session selected from multiple healthcare session types and a scheduled time for the healthcare session. The server system can transmit a second request to schedule the healthcare session to the second device. Responsive to receiving an acceptance of scheduling the healthcare session from the second device, the server system can determine a bandwidth allocation for a first network slice of the 5G telecommunications network required for conducting the healthcare session based on the type of the healthcare session and the scheduled time. The server system can associate the first network slice with the first device and the second device. At the time of the scheduled healthcare session, the server system can establish a 5G wireless connection between the first device and the second device via the first network slice.

In another example, a server system receives a first request to schedule a healthcare session from a first device associated with a healthcare management system. The server system can be associated with a 5G telecommunications network for providing network slicing connections in a healthcare management system. The healthcare session can be between the first device and a second device. The first request can be received from a software application for managing healthcare sessions operating on the first device. The first request can indicate a type of the healthcare session selected from multiple healthcare session types and a scheduled time for the healthcare session. The server system can determine a bandwidth allocation for a first network slice of the 5G telecommunications network required for conducting the healthcare session based on the type of the healthcare session and the scheduled time. The server system can associate the first network slice with the first device and the second device. At the time of the scheduled healthcare session, the server system can establish a 5G wireless connection between the first device and the second device via the first network slice.

In yet another example, a computer-readable storage medium includes instructions for managing healthcare sessions recorded thereon. When executed by at least one data processor of a first device associated with a healthcare provider, the instructions can cause the first device to transmit a first request to schedule a healthcare session between the first device and a second device. The first request is transmitted from a software application on the first device to a server system associated with a 5G telecommunications network. The second device can be associated with the healthcare management system. The healthcare session is via the 5G telecommunications network. The first request can indicate a type of the healthcare session selected from multiple healthcare session types and a scheduled time for the healthcare session. The first device can cause the server system to transmit a second request to schedule the healthcare session to the second device. Responsive to receiving an acceptance of scheduling the healthcare session from the second device, the second device can cause the server system to determine a bandwidth allocation for a first network slice of the 5G telecommunications network required for conducting the healthcare session based on the type of the healthcare session and the scheduled time. The first device can cause the server system to associate the first network slice with the first device and the second device. At the time of the scheduled healthcare session, the first device can cause the server system to establish a 5G wireless connection between the first device and the second device via the first network slice.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
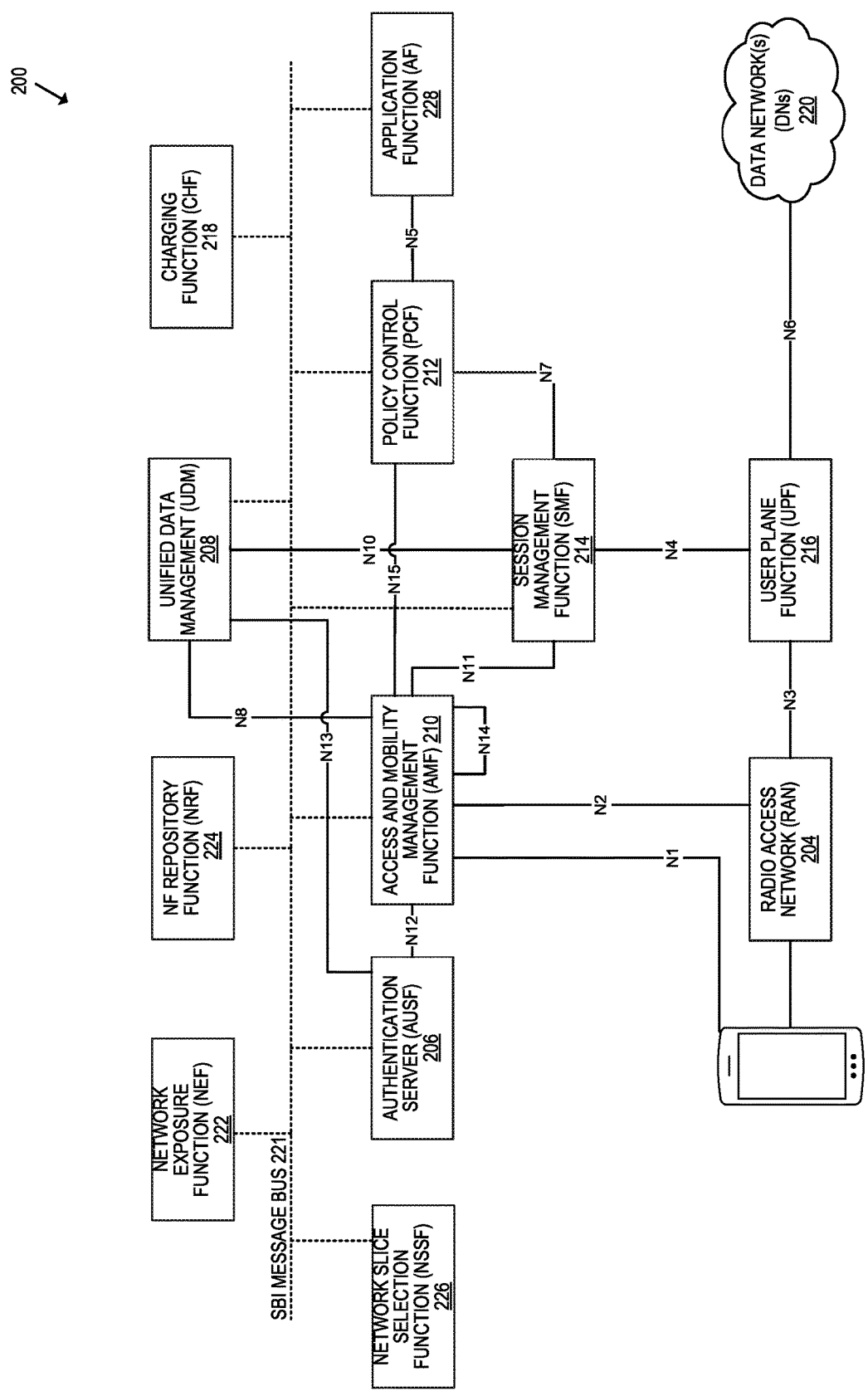
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Network Slicing System

Figure 3:
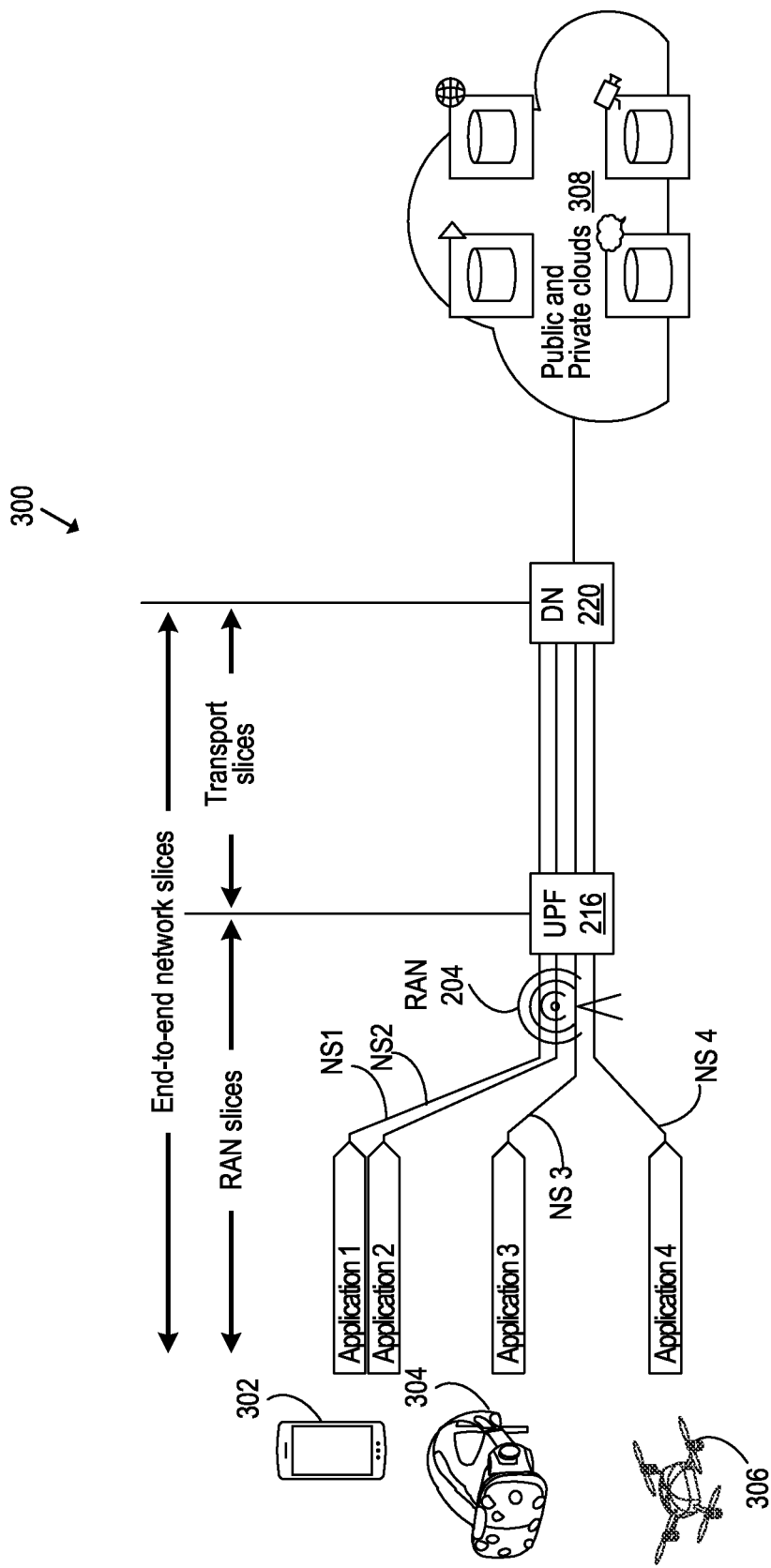
FIG. 3 is a block diagram that illustrates an example network slicing system in a 5G network.

FIG. 3 is a block diagram that illustrates an example network slicing system 300 in a 5G network. The network slicing system 300 enables multiplexing of virtualized and independent logical networks (i.e., network slices NS1 through NS4) on the same physical network infrastructure. In 5G wireless networks, network slicing assumes a central role designed to efficiently embrace multiple services with very different service-level requirements (e.g., data transfer speed, reliability, bandwidth). The end-to-end network slices can be defined between wireless devices (e.g., wireless devices 302, 304, and 306) and DN 220. For example, each network slice is an isolated end-to-end network tailored to fulfill diverse requirements requested by a particular application (e.g., wireless applications 1 through 4 associated with the wireless devices 302, 304, and 306). The network slicing system 300 can be in communication with public and private clouds 308. For example, the clouds 308 can include cloud servers associated with the different wireless applications 1 through 4.

An infrastructure associated with the network slicing system includes hardware and software resources, such as user equipment and/or compute-, storage- and networking-hardware equipment, as well as the services and software programs stored thereof. The infrastructure can be used to implement physical network nodes and/or to define a distributed cloud environment, such as Physical Network Functions (PNFs) and/or the Network Functions Virtualization Infrastructure (NFVI). The infrastructure provides the support and management functionality that allows for the deployment and operation of individual network slices. The network function/logical network stratum 303 includes a collection of PNFs. It provides the user control and application plane functionality across the different network segments, including the RAN slices between wireless devices (e.g., wireless devices 302, 304, and 306) and the UPF 216 and transport slices between the UPF 216 and DN 220.

5G Network Slicing in a Healthcare Management System

Figure 4:
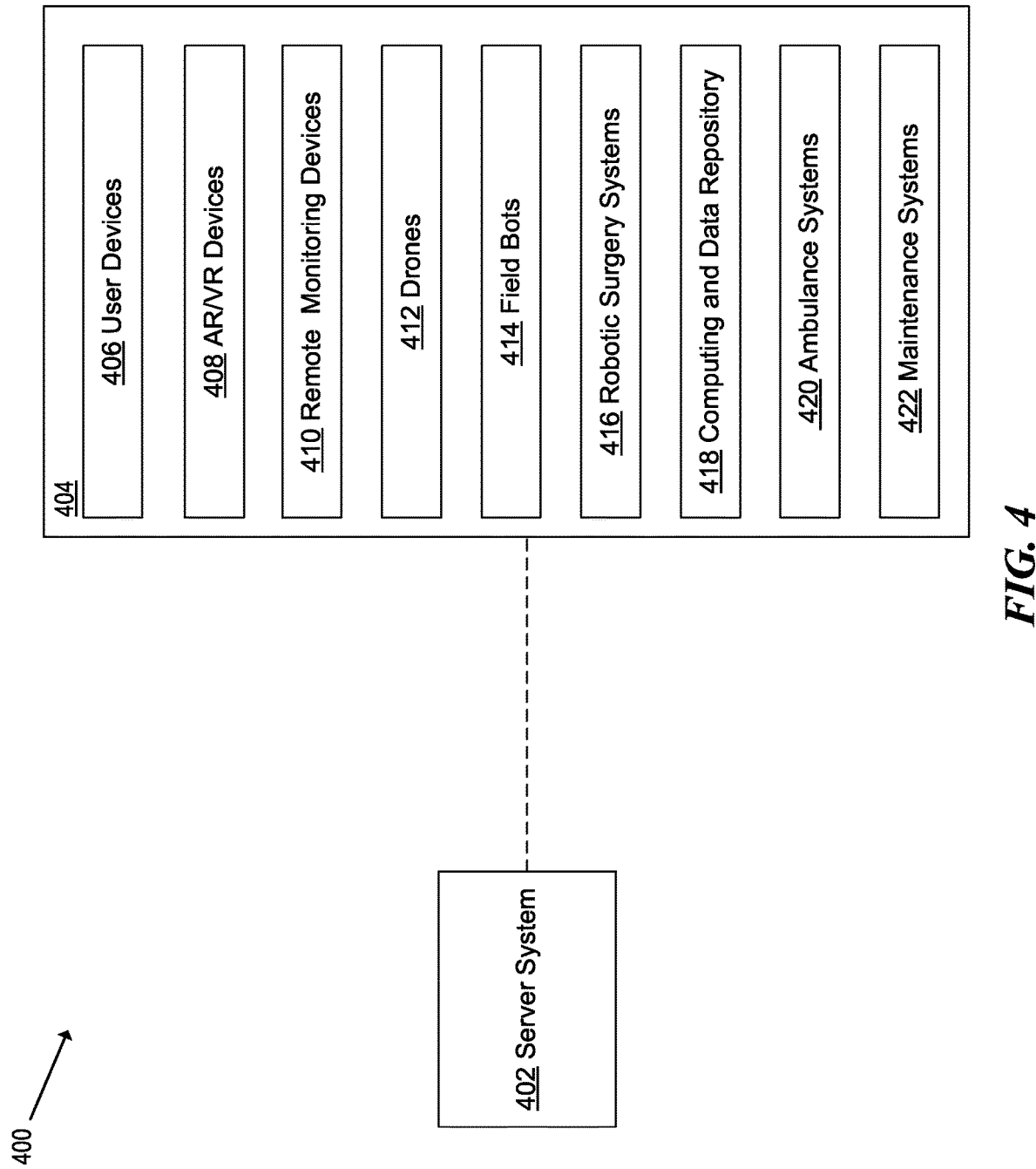
FIG. 4 is a block diagram that illustrates an example healthcare management system.

FIG. 4 is a block diagram that illustrates an example healthcare environment 400. The healthcare environment 400 includes a healthcare management system 404 and a server system 402. The server system 402 can include a computer system (e.g., a computer system 600 in FIG. 6). The server system 402 can be associated with a 5G network (e.g., the network 100 in FIG. 1) and can be configured to facilitate the management of 5G network slicing, as described with respect to FIG. 3. The server system 402 is in wireless communication with the healthcare management system 404. The server system 402 is configured to communicate with the various devices and systems of the healthcare management system 404 and to facilitate communications between the various devices and systems of the healthcare management system via the 5G network.

The healthcare management system 404 can be associated with a healthcare provider organization or a network of healthcare provider organizations. A healthcare organization can be associated with hospitals, healthcare centers, diagnosis centers, emergency services, research centers, patient data management, and/or other healthcare-related services. The healthcare management system 404 is configured to provide and manage healthcare services of a variety of types. The healthcare services can be localized (e.g., involving a single hospital) or a network of services spread around a large geographical area (e.g., a statewide or a nationwide hospital network). The healthcare management system 404 includes, or is in communication with, one or more of user devices 406, augmented reality/virtual reality (AR/VR) devices 408, remote monitoring devices 410, drones 412, field bots 414, robotic surgery systems 416, computing and data repository 418, ambulance systems 420, and maintenance systems 422.

The user devices 406 can include wireless devices such as smartphones, tablet computers, laptop computers, personal computers (PC), or wearable devices (e.g., smart watches). Such user devices can correspond to the computer system 600 described with respect to FIG. 6. The user devices can be associated with healthcare providers and be operated, for example, by physicians, nurses, healthcare workers, and/or administrative personnel associated with healthcare providers. The user devices 406 can also be associated with patients. The user devices 406 can include a software application that enables the user devices 406 to communicate (directly or indirectly) with the other devices and systems of the healthcare management system 404 as well as with the server system 402. The software application can be used to facilitate scheduling and establishing remote healthcare sessions via a 5G network. The healthcare sessions can be between user devices 406 (e.g., a videoconference between a patient and a physician) or between a user device and any of the other systems and devices of the healthcare management system 404.

The AR/VR devices 408 (also including mixed reality MR devices) can include VR and/or AR headsets or other devices (e.g., smart glasses, smartphones, laptop computers, or tablet computers) configured to provide virtual and augmented reality. VR can refer to a computer-generated immersive environment provided to a user by a VR headset. AR can refer to an environment where computer-generated objects and features are provided to augment (modify or enhance) a real-world view of the environment. AR can be provided to a user by an AR headset, smart glasses, smartphones, laptop computers, or tablet computers. The AR/VR devices 408 can include a software application that enables users of the AR/VR devices 408 to interact in a virtual or augmented reality. For example, two users wearing AR/VR headsets located in different geographical spaces (e.g., not within viewing distance from each other) can interact with each other in a virtual or augmented space generated by the software application. The users are able to see each other's avatars that mimic the speech, gestures, and movement of their respective users. In the healthcare management system 404, the AR/VR devices 408 can be used for remote healthcare sessions such that a healthcare provider and a patient are both wearing AR/VR headsets and interacting with each other in a virtual or augmented space generated by the software application.

The remote monitoring devices 410 can include medical devices or diagnostic devices that are used to test or monitor a patient's health parameters (e.g., heart rate, blood pressure, glucose levels, oxygen levels, or activity levels) at a location that is separate from a healthcare provider. The remote monitoring devices 410 can also include imaging devices (e.g., X-ray, ultrasound, magnetic resonance imaging (MRI), and/or computed tomography (CT) scanners). For example, a patient's health parameters can be measured by one or more remote monitoring devices 410 while the patient is at his or her home, nursing home, medical center, etc. The remote monitoring devices 410 can transfer the results in real time to a healthcare provider (e.g., located at a hospital that is remote from the patient) who can review the health parameters to assess the patient's condition. In some implementations, the remote monitoring devices 410 are part of an Internet of Medical Things (IoMT), which is a network of medical devices connected via a 5G network. In some implementations, the remote monitoring devices 410 are wearable devices (e.g., wearable glucose meters).

The drones 412 (e.g., medical drones or medical delivery drones) can include unmanned aerial vehicles (UAVs) configured to transport medical supplies, medicines, equipment, and/or specimens. The drones 412 can be operated by instructions transferred to the drones 412 via a 5G network from a drone control system associated with the healthcare management system 404. As an example, the drones 412 can be instructed to transport medical supplies or medicines to patients in remote locations. As another example, the drones 412 can be instructed to transport medical supplies, medicines, or equipment to emergency sites (e.g., in an instance of a car accident).

The field bots 414 (e.g., field robots) can include robotic systems configured to perform a variety of tasks to assist healthcare and emergency professionals in outdoor environments. The field bots 414 can be operated by instructions transferred to the field bots 414 via a 5G network from a bots control system associated with the healthcare management system 404. Field bots 414 can be used in rescue and search missions. In particular, field bots 414 can be deployed to help in emergency situations (e.g., natural disasters, accidents, fires, hazardous conditions) to deliver supplies, provide communication, and gather information. In some implementations, the field bots 414 can be instructed to provide medical assistance to patients in outdoor environments.

The robotic surgery systems 416 can include robots and associated control systems for performing surgery on patients. A robot configured to perform surgeries can include an enhanced precision robotic arm equipped with surgical instruments and sensors (e.g., cameras). The robot can be operated by instructions transferred to the robotic surgery systems 416 via a 5G network from the healthcare management system 404. In some embodiments, the robotic surgery systems 416 receive instructions from a user device (e.g., of the user devices 406) associated with a physician.

The computing and data repository 418 can include data storage and processing systems configured to store and/or process data associated with the healthcare management system 404. The data can include patient data, medical equipment and facilities data, healthcare provider data, etc. The computing and data repository 418 can receive data from other systems and devices of the healthcare management systems, process the data (e.g., perform computations), and output processed results. In some embodiments, the computing and data repository 418 can include, or be in communication with, artificial intelligence (AI) systems. AI systems are described in more detail with respect to FIG. 7. The computing and data repository 418 can be configured to analyze data associated with the healthcare management system 404 using AI.

The ambulance systems 420 can include ambulances (or other vehicles such as helicopters) as well as medical equipment for providing emergency medical services (EMS) associated with the ambulances. The ambulance systems 420 can be configured to communicate with healthcare providers (e.g., the user devices 406 associated with hospitals, emergency facilities, and/or physicians) via a 5G network. For example, the ambulance systems 420 can provide information regarding a patient's condition to an emergency facility while the patient is being transported. This allows the emergency facility to allocate appropriate facilities, equipment, medicine, or personnel to the care of the patient at the emergency facility.

The maintenance systems 422 can include one or more computing devices configured to monitor and maintain operations of medical devices and systems associated with the healthcare management system 404. The medical devices and systems can include the remote monitoring devices 410, the drones 412, the field bots 414, the robotic surgery systems 416, and the ambulance systems 420. The maintenance systems 422 are configured to ensure that the medical devices and systems operate appropriately. The maintenance can include software-associated maintenance (e.g., running software updates, releasing bug fixes, or running security updates) as well as identifying needs and requesting assistance for hardware-associated maintenance.

Figure 5:
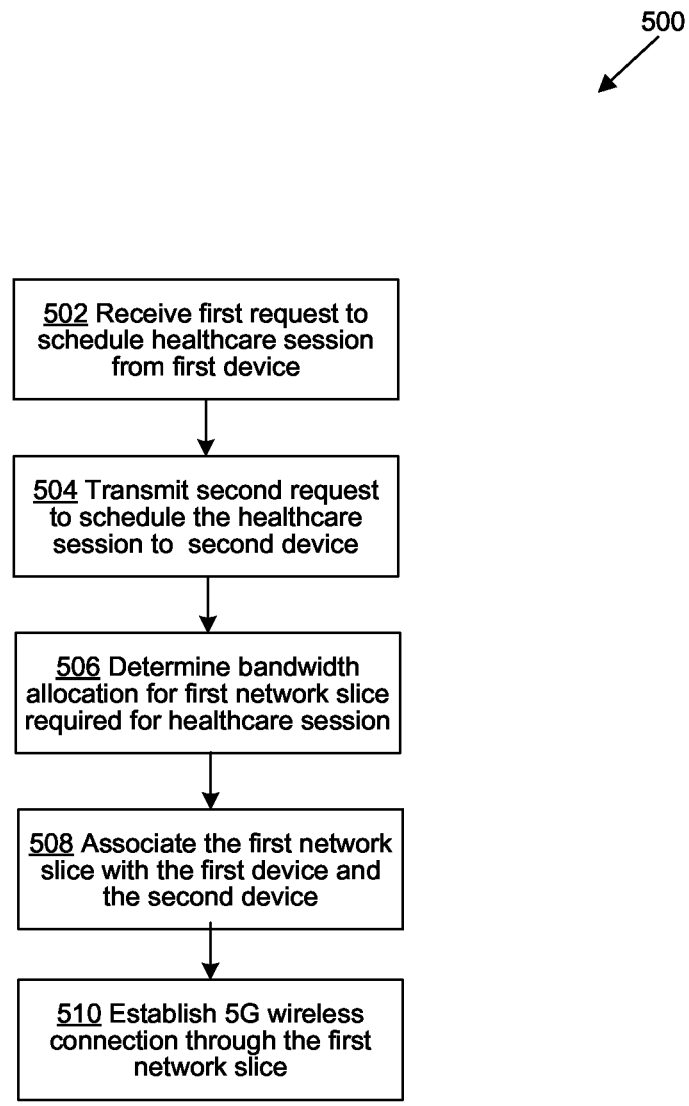
FIG. 5 is a flow diagram that illustrates a process for providing 5G network slicing connections in a healthcare management system.

FIG. 5 is a flow diagram that illustrates a process 500 for providing 5G network slicing connections in a healthcare management system. The process 500 can be performed by a server system (e.g., the server system 402 in FIG. 4) associated with a 5G telecommunications network (e.g., the architecture 200 in FIG. 2). The server system can be configured to provide network slicing (e.g., FIG. 3) for a healthcare management system (e.g., the healthcare management system 404 in FIG. 4). The server system can be associated with a telecommunications network (e.g., the system 100 in FIG. 1) and include at least one hardware processor and at least one non-transitory memory storing instructions (e.g., the computer system 600 described with respect to FIG. 6). When the instructions are executed by the at least one hardware processor, the server system performs the process 500.

The process 500 is directed for providing reliable, secure, and private remote diagnosis and treatment of patients. Specifically, the process 500 can facilitate automated and efficient methods and systems of creating connections via 5G network slices between devices within a healthcare system for scheduled healthcare sessions. The process 500 can include assisting in scheduling of healthcare sessions and concurrently establishing connections for the scheduled healthcare sessions via 5G network slices. The server system allocates an appropriate bandwidth for the network slices based on the requirement of the healthcare session. The concurrent scheduling and establishment of remote healthcare sessions and respective connections can reduce the time required for accessing healthcare services. The process 500 can increase the effectiveness of diagnosis and treatment of patients compared to conventional, in-person diagnosis and treatment methods.

At 502, the server system receives a first request to schedule a healthcare session from a first device (e.g., a first device of the user devices 406 in FIG. 4) associated with the healthcare management system. The healthcare session can be between the first device and a second device associated with the healthcare management system. For example, the second device is a second device of the user devices 406 or some other device or a system of 408 through 422 of the healthcare management system 404.

The first request can be received from a software application for managing healthcare sessions operating on the first device. For example, the first device is a smartphone, laptop computer, tablet computer, or PC that operates a software application associated with the server system 402 in FIG. 4. The first request can indicate a type of the healthcare session selected from multiple healthcare session types and a scheduled time for the healthcare session. The scheduled time an include a date, a time, and/or duration of the healthcare session. The multiple healthcare session types can include a videoconference (e.g., by the user devices 406), a virtual reality meeting (e.g., by the AR/VR devices 408), a robotic surgery (e.g., by the robotic surgery systems 416), medical data collection or monitoring (e.g., by the remote monitoring devices), medical supply or device delivery (e.g., by the drones 412 or field bots 414), robotic medical, emergency, or rescue assistance (e.g., by the field bots 414), data transmission (e.g., by the computing and data repository 418), emergency care during transportation (e.g., by the ambulance systems), or a medical device or system maintenance (e.g., by the maintenance systems 422). The healthcare session can be via the 5G telecommunications network.

At 504, the server system can transmit a second request to schedule the healthcare session to the second device. In some implementations, a software application on the second device is configured to receive the second request. A user of the second device can accept the request and send an acceptance to the server system 402. For example, the second device can be associated with a patient who accepts the request for the healthcare session. In some implementations, the request can be automatically accepted by the software on the second device, and an acceptance is transmitted to the server system 402 in response to the automated acceptance.

At 506, responsive to receiving an acceptance of scheduling the healthcare session from the second device, the server system can determine a bandwidth allocation for a first network slice (e.g., NS1, NS2, NS3, or NS4 in FIG. 3) of the 5G telecommunications network required for conducting the healthcare session based on the type of the healthcare session. In some implementations, determining the bandwidth allocation of the first network slice can include determining a data transmission rate, jitter, packet loss, and/or reliability required for conducting the healthcare session. Allocation of an appropriate bandwidth based on the type of healthcare session is important for ensuring that the network can operate without congestions or interruptions. The server system avoids reserving too much bandwidth for a connection than is needed. For example, a videoconference, a virtual reality meeting, a robotic surgery, or field bots or drones-related healthcare sessions can have different requirements, and the bandwidth allocation is determined according to the different requirements. In some implementations, the bandwidth allocation for the first network slice can be determined based on one or more attributes of the software application operating on the first device. The bandwidth allocation depends on the type of software application (a software application on a user device, AR/VR device, robotic surgery systems, etc.), which is related to the type of healthcare session. In some implementations, the system can dedicate quality of data (QoD) for a healthcare session based on the type of devices associated with the healthcare session to ensure appropriate network performance.

The server system can determine the bandwidth allocation for the first network slice of the 5G telecommunications network required for conducting the healthcare session also based on the scheduled time. A time of day as well as the date of the week can influence data transmission rate, jitter, packet loss, and/or reliability because network congestion is dependent on the amount of users concurrently using the network.

In some implementations, the server system can determine the geographical locations of the first device and the second device. The bandwidth allocation for the first network slice can be further determined based on the geographical locations of the first device and the second device. The geographical location of a device can also influence the data transmission rate, jitter, packet loss, and/or reliability because network congestion is dependent on geographical locations.

At 508, the server system can associate the first network slice with the first device and the second device. The server system can associate the first network slice with the first device and the second device at the time of the start of the healthcare session, as indicated in the first request, a predefined time before the time of the start of the healthcare session (e.g., 1 min, 5 mins, or 10 mins before). The association can be made for a duration of the healthcare session as indicated in the first request, or for a predefined time depending on the type of the healthcare session. For example, a videoconference can have a predefined time of one hour while a robotic surgery can have a predefined time of 2-10 hours. At 510, at the time of the scheduled healthcare session, the server system can establish a 5G wireless connection between the first device and the second device via the first network slice. In some implementations, the server system 402 in FIG. 4 can support multiplexing of virtualized and independent logical networks (e.g., network slices NS1, NS2, NS3, NS4 in FIG. 3) between the first device and the second device. The association can include determining the number or type of network slices that the first device and the second device are authorized to communicate with based on the type of the healthcare session. For example, prior to associating the first network slice of the 5G telecommunications network with the first device and the second device, the control plane subsystem (e.g., the UDM 208 in FIG. 5) can determine whether the first device and the second device are authorized to communicate via the first network slice based on the type of the healthcare session as well as the software applications on the first device and the second device, the scheduled time, and/or geographical locations.

In some implementations, the first device can be a wireless device associated with a healthcare provider, and the second device can be a wireless device associated with a patient (e.g., the first device and the second device are user devices of the user devices 406). The type of the healthcare session can be a videoconference between the first device and the second device.

In some implementations, the first device can be associated with a healthcare provider, and the second device can be associated with a patient. The first device and the second device can be AR/VR devices (e.g., the AR/VR devices 408). The type of the healthcare session can be a virtual reality meeting between the first device and the second device.

In some implementations, the first device can be associated with a physician, and the second device can be associated with a robotic surgery system (e.g., the robotic surgery systems 416 in FIG. 4). The type of the healthcare session can include a remote surgery such that the robotic surgery system is located in a different geographical location than the first device (e.g., the physician is not present in the same location as the patient being operated on). The first device can be configured to transmit instructions to the robotic surgery system during the remote surgery to perform surgery on a patient. The instructions can be transmitted via the first network slice.

In some implementations, the first device can be associated with a physician, and the second device can be associated with a medical device for monitoring at least one medical condition of a patient (e.g., the remote monitoring devices 410). The first device is configured to transmit instructions to the medical device to collect medical data associated with the patient and receive the collected medical data from the second device during the healthcare session via the first network slice.

In some implementations, the second request is accepted by a different device than the second device. For example, the server system 402 can send the second request to the different user device (e.g., of the user devices 406) that is associated with any other medical device or system of the healthcare management system. The server system can receive an acceptance from the different device and then establish the connection via the first network slice between the first device and the second device. As an example, the different user device can be associated with a user operating the robotic surgery system, the ambulance system, the remote monitoring device, the drones, the field bots, etc. As another example, the different user device can be a user device associated with the patient (e.g., a smartphone or a laptop), and the second device is an AR/VR device.

In some implementations, the server system receives a third request to schedule an additional healthcare session from the first device. The third request can indicate a particular type and a scheduled time for the additional healthcare session. The server system can select a third device from among multiple devices located at different geographical locations based on the particular type of the additional healthcare session and the scheduled time for the additional healthcare session. The server system can transmit a fourth request for the additional healthcare session to the selected third device. For example, a healthcare provider can schedule the additional healthcare session between a patient and a physician. The physician can be any physician associated with the type of the additional healthcare session (e.g., a physician performing robotic surgeries, videoconferencing, or virtual reality meetings). The server system selects the physician, and thereby the third device, based on the availability of the physician, the expertise of the physician, a patient-physician history, or any other relevant reason.

In some implementations, the server system receives a fifth request from the first device to schedule an additional healthcare session between the first device and a fourth device. The server system can determine that the first device and the fourth device are located within a threshold distance from each other (e.g., the threshold distance ranging from 100 meters to tens of kilometers). In some implementations, the server system can determine that the first device and the second device are within the same hospital building or campus. The server system can transmit the additional request for the healthcare session to the fourth device. Responsive to receiving an acceptance for the healthcare session from the fourth device and determining that the first device and the fourth device are located within the threshold distance from each other, the server system can establish a local area network (LAN) connection between the first device and the fourth device. The LAN can include ethernet, fiber optic, Wi-Fi, or LAN over wide area network (WAN) (e.g., using virtual private networks (VPNs)). Utilizing the LAN connections between devices that are located within an appropriate distance can reduce the data transfer and risk of congestion over the 5G network, thereby increasing the reliability of 5G network operations.

In some implementations, the server system can receive an indication from the first device to schedule multiple healthcare sessions for a patient associated with the second device. The indication can include information about a health condition that the patient is diagnosed with or is suspected to be diagnosed with. The server system can determine a set of healthcare sessions for treatment or diagnosis of the health condition based on the health condition. The set of healthcare sessions can be between multiple different devices of the healthcare management system. For example, the set of healthcare sessions includes sessions associated with the diagnosis or treatment of a particular condition. The multiple healthcare sessions can include doctor's and nurse's appointments, therapist appointments, healthcare testing (e.g., laboratory testing or imaging), surgeries, or any other healthcare sessions associated with the healthcare management system. The server system can transmit respective requests to the multiple different devices for the set of healthcare sessions. For example, the server system can automatically schedule the set of healthcare sessions. The automatic scheduling can include scheduling the healthcare sessions in a timely order (e.g., ordering blood tests or imaging prior to a doctor's appointment). The server system can determine respective bandwidth allocations for network slices of the 5G telecommunications network required for conducting the set of healthcare sessions. The server system can establish 5G wireless connections between the multiple different devices through the respective network slices at times of the respective sessions of the set of healthcare sessions.

In some implementations, the server system can be configured to schedule a first set of diagnostic healthcare sessions when the patient is suspected of having a first condition and a second set of diagnostic healthcare sessions when the patient is suspected of having a second condition different from the first condition. Alternatively, the server system can be configured to schedule a first set of treatment healthcare sessions when the patient is diagnosed with the first condition and a second set of treatment healthcare sessions when the patient is suspected to have the second condition. The sets of healthcare sessions vary based on the condition. For example, diagnosis and treatment of a neurodevelopmental disorder (e.g., autism spectrum disorder) for a child can involve videoconferences with the child's parents, observation and behavioral assessment of the child, medical evaluation of the child (e.g., vision and hearing testing), and occupational therapy, social skills training, speech-language therapy, and/or cognitive behavioral therapy of the child. A set of healthcare sessions determined by the server system can include a variety of conference calls, virtual reality meetings, medical data collection or monitoring, and/or other types of healthcare sessions. As another example, diagnosis and treatment of an autoimmune condition (e.g., lupus erythematosus) can include laboratory testing, imaging, videoconferences between the patient and healthcare providers, evaluation of medical history, biologic therapy, medical therapy, and condition monitoring. A set of healthcare sessions determined by the server system can include a variety of conference calls, virtual reality meetings, medical data collection, and/or other types of healthcare sessions.

In some implementations, determining the set of healthcare sessions for treatment or diagnosis of the condition is performed based on an artificial intelligence (AI) model. A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the AI model for determining the set of healthcare sessions for treatment or diagnosis of the condition can be a neural network with multiple input nodes that receive the parameters associated with the particular segment as input. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer ("the output layer"), one or more nodes can produce a value classifying the input that, once the model is trained, can be used as a prediction for determining the set of healthcare sessions. In some implementations, such neural networks, known as deep neural networks, can have multiple layers of intermediate nodes with different configurations and can be a combination of models that receive different parts of the input and/or input from other parts of the deep neural network or are convolutions-partially using output from previous iterations of applying the model as further input to produce results for the current input.

An ML model can be trained with supervised learning, where the training data includes parameters associated with historical patient data and corresponding healthcare sessions as input and a desired output, such as a successful treatment or diagnosis of the health condition. A representation of the treatment or diagnosis can be provided to the model. Output from the model can be compared to the desired output for that treatment or diagnosis, and based on the comparison, the model can be modified, such as by changing weights between nodes of the neural network or parameters of the functions used at each node in the neural network (e.g., applying a loss function). After modifying the model in this manner, the model can be trained to evaluate healthcare sessions required for diagnosis or treatment of the health condition.

Here, the AI model can be trained with historical patient treatment or diagnosis data associated with the health condition. For example, the server system can be in communication with the computing and data repository 418 in FIG. 4, which includes AI systems (e.g., the AI system 700 in FIG. 7). The AI system can include an algorithm (e.g., algorithm 716) that is trained based on historical patient treatment or diagnosis data. The historical patient treatment or diagnosis data can include, for example, a set of healthcare sessions that have been used to treat or diagnose a patient with a particular condition and the associated particular condition. The AI model can thereby determine the set of healthcare sessions required to diagnose or treat the particular condition. The model can further take into account the medical history and health parameters associated with the patient (e.g., age, gender, health parameters, or other medical conditions).

Computer System

Figure 6:
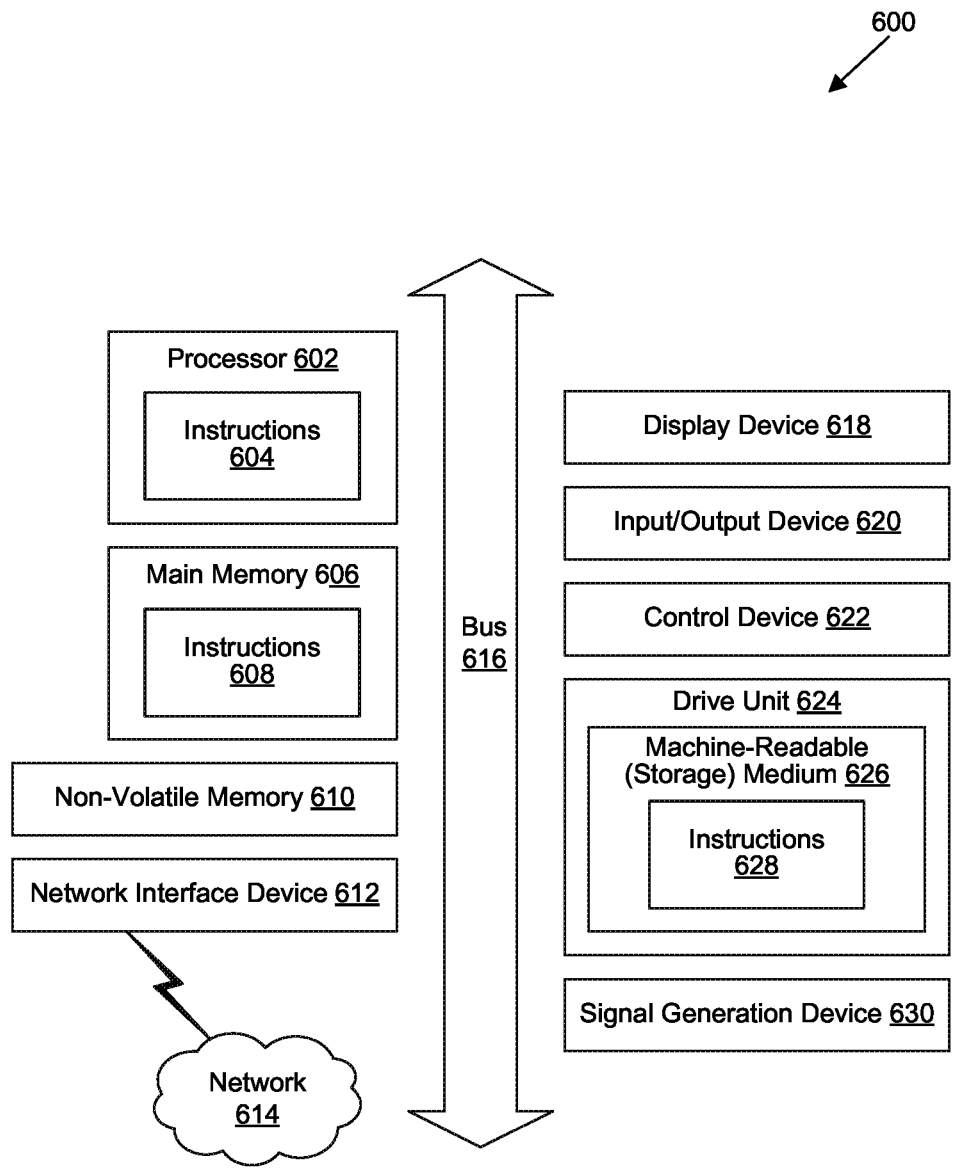
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, PC, tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

AI System

Figure 7:
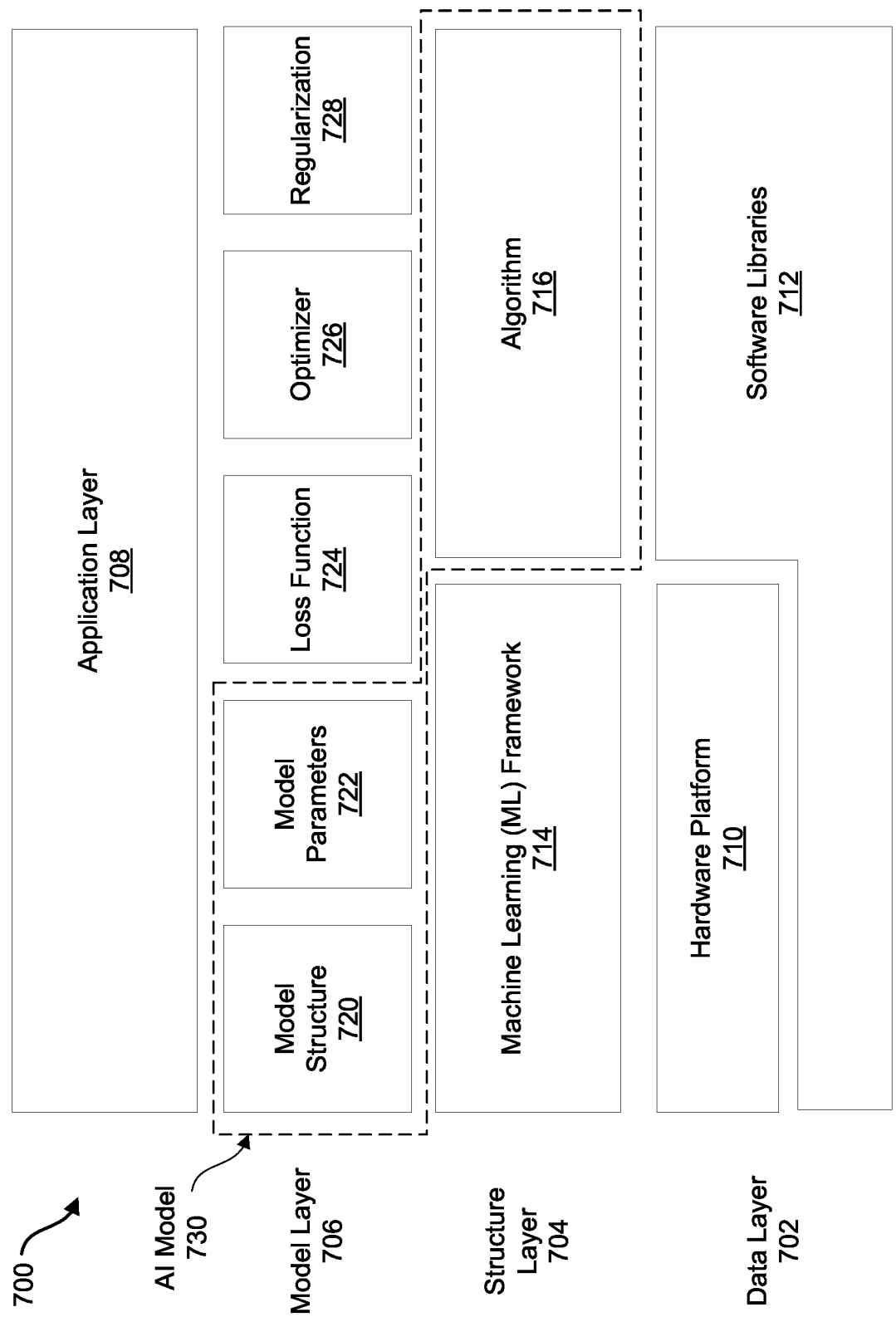
FIG. 7 is a block diagram that illustrates an example of an AI system in which at least some operations described herein can be implemented.

FIG. 7 is a block diagram that illustrates an example of an AI system 700 in which at least some operations described herein can be implemented. As shown, the AI system 700 can include a set of layers, which conceptually organize elements within an example network topology for the AI system's architecture to implement a particular AI model 730. Generally, an AI model 730 is a computer-executable program implemented by the AI system 700 that analyzes data to make predictions. Information can pass through each layer of the AI system 700 to generate outputs for the AI model 730. The layers can include a data layer 702, a structure layer 704, a model layer 706, and an application layer 708. The algorithm 716 of the structure layer 704 and the model structure 720 and model parameters 722 of the model layer 706 together form the example AI model 730. The optimizer 726, loss function engine 724, and regularization engine 728 work to refine and optimize the AI model 730, and the data layer 702 provides resources and support for the application of the AI model 730 by the application layer 708.

The data layer 702 acts as the foundation of the AI system 700 by preparing data for the AI model 730. As shown, the data layer 702 can include two sub-layers: a hardware platform 710 and one or more software libraries 712. The hardware platform 710 can be designed to perform operations for the AI model 730 and include computing resources for storage, memory, logic, and networking, such as the resources described in relation to FIG. 5. The hardware platform 710 can process amounts of data using one or more servers. The servers can perform backend operations such as matrix calculations, parallel calculations, machine learning (ML) training, and the like. Examples of servers used by the hardware platform 710 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 710 can include Infrastructure as a Service (IaaS) resources, which are computing resources (e.g., servers, memory, etc.), offered by a cloud services provider. The hardware platform 710 can also include computer memory for storing data about the AI model 730, application of the AI model 730, and training data for the AI model 730. The computer memory can be a form of random-access memory (RAM), such as dynamic RAM, static RAM, and non-volatile RAM.

The software libraries 712 can be thought of as suites of data and programming code, including executables, used to control the computing resources of the hardware platform 710. The programming code can include low-level primitives (e.g., fundamental language elements) that form the foundation of one or more low-level programming languages, such that servers of the hardware platform 710 can use the low-level primitives to carry out specific operations. The low-level programming languages do not require much, if any, abstraction from a computing resource's instruction set architecture, allowing them to run quickly with a small memory footprint.

The structure layer 704 can include an ML framework 714 and an algorithm 716. The ML framework 714 can be thought of as an interface, library, or tool that allows users to build and deploy the AI model 730. The ML framework 714 can include an open-source library, an Application Programming Interface (API), a gradient-boosting library, an ensemble method, and/or a deep learning toolkit that work with the layers of the AI system to facilitate the development of the AI model 730. For example, the ML framework 714 can distribute processes for the application or training of the AI model 730 across multiple resources in the hardware platform 710. The ML framework 714 can also include a set of pre-built components that have the functionality to implement and train the AI model 730 and allow users to use pre-built functions and classes to construct and train the AI model 730. Thus, the ML framework 714 can be used to facilitate data engineering, development, hyperparameter tuning, testing, and training for the AI model 730.

The algorithm 716 can be an organized set of computer-executable operations used to generate output data from a set of input data and can be described using pseudocode. The algorithm 716 can include complex code that allows the computing resources to learn from new input data and create new/modified outputs based on what was learned. In some implementations, the algorithm 716 can build the AI model 730 through being trained while running computing resources of the hardware platform 710. This training allows the algorithm 716 to make predictions or decisions without being explicitly programmed to do so. Once trained, the algorithm 716 can run at the computing resources as part of the AI model 730 to make predictions or decisions, improve computing resource performance, or perform tasks. The algorithm 716 can be trained using supervised learning, unsupervised learning, semi-supervised learning, and/or reinforcement learning.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A server system associated with a 5G telecommunications network for providing network slicing connections in a healthcare management system, the server system comprising:
   at least one hardware processor; and
   at least one non-transitory memory storing instructions, which, when executed by the at least one hardware processor, cause the server system to:
      receive, from a first device associated with the healthcare management system, a first request to schedule a first healthcare session between the first device and a second device associated with the healthcare management system via the 5G telecommunications network,
         wherein the first request is received from a software application for managing healthcare sessions operating on the first device, and
         wherein the first request indicates: (1) a type of the first healthcare session selected from multiple healthcare session types, and (2) a scheduled first time for the first healthcare session;
      receive, from the first device, a second request to schedule a second healthcare session related to the first healthcare session between the first device and a third device at a second time subsequent to the first time;
      determine whether the first device and the third device are located within a threshold distance from each other;
      transmit a third request to schedule the first healthcare session to the second device;
      transmit a fourth request to schedule the second healthcare session to the third device;
      responsive to receiving an acceptance of scheduling the first healthcare session from the second device:
         determine, based on the type of the first healthcare session and the scheduled time, a bandwidth allocation for a first network slice of the 5G telecommunications network required for conducting the first healthcare session;
         associate the first network slice with the first device and the second device;
         at the first time of the scheduled first healthcare session, establish a 5G wireless connection between the first device and the second device via the first network slice; and
      responsive to receiving an acceptance for the second healthcare session from the third device and determining that the first device and the third device are located within the threshold distance from each other, establish a local area network (LAN) connection between the first device and the third device at the second time.

2. The server system of claim 1,
wherein determining the bandwidth allocation of the first network slice comprises determining at least one of: a data transmission rate, jitter, packet loss, or reliability required for conducting the first healthcare session.

3. The server system of claim 1,
wherein the bandwidth allocation for the first network slice is determined based on one or more attributes of the software application operating on the first device.

4. The server system of claim 1,
wherein the first device is a wireless device associated with a healthcare provider and the second device is a wireless device associated with a patient, and
wherein the type of the first healthcare session is a videoconference between the first device and the second device.

5. The server system of claim 1,
wherein the first device is associated with a healthcare provider and the second device is associated with a patient,
wherein the first device and the second device are augmented reality/virtual reality (AR/VR) devices; and
wherein the type of the first healthcare session is a virtual reality meeting between the first device and the second device.

6. The server system of claim 1,
wherein the first device is associated with a physician and the second device is associated with a robotic surgery system,
wherein the type of the first healthcare session includes a remote surgery such that the robotic surgery system is located in a different geographical location than the first device, and
wherein, during the remote surgery, the first device is configured to transmit instructions, via the first network slice, to the robotic surgery system to perform a surgery on a patient.

7. The server system of claim 1,
wherein the first device is associated with a physician and the second device is associated with a medical device for monitoring at least one medical condition of a patient, and
wherein, during the first healthcare session, the first device is configured to transmit instructions to the medical device to collect medical data associated with the patient and receive the collected medical data from the second device.

8. The server system of claim 1, wherein the server system is further caused to:
receive, from the first device, a fifth request to schedule an additional healthcare session,
wherein the fifth request indicates a particular type and a scheduled third time of the additional healthcare session;
select, based on the particular type of the additional healthcare session and the scheduled third time for the additional healthcare session, a fourth device from among multiple devices located at different geographical locations; and
transmit a sixth request for the additional healthcare session to the selected third device.

9. The server system of claim 1, wherein the server system is further caused to:
receive, from the first device, an indication to schedule multiple healthcare sessions for a patient associated with the second device,
wherein the indication includes information about a health condition that the patient is diagnosed with;
determine, based on the health condition, a set of healthcare sessions for treatment of the health condition,
wherein the set of healthcare sessions are between multiple different devices of the healthcare management system;
transmit respective requests to the multiple different devices for the set of healthcare sessions;
determine respective bandwidth allocations for network slices of the 5G telecommunications network required for conducting the set of healthcare sessions; and
at times of the respective sessions of the set of healthcare sessions, establish 5G wireless connections between the multiple different devices through the respective network slices.

10. The server system of claim 9,
wherein determining the set of healthcare sessions for treatment of the condition is performed based on an artificial intelligence (AI) model, and
wherein the AI model is trained with historical patient treatment data associated with the health condition.

11. The server system of claim 1, wherein the server system is further caused to:
determine geographical locations of the first device and the second device,
wherein the bandwidth allocation for the first network slice is further determined based on the geographical locations of the first device and the second device.

12. A server system associated with a 5G telecommunications network for providing network slicing connections in a healthcare management system, the server system comprising:
at least one hardware processor; and
at least one non-transitory memory storing instructions, which, when executed by the at least one hardware processor, cause the server system to:
receive, from a first device associated, a first request to schedule a first healthcare session between the first device and a second device via the 5G telecommunications network,
wherein the first request is received from a software application for managing healthcare sessions operating on the first device,
wherein the first request indicates: (1) a type of the first healthcare session selected from multiple healthcare session types, (2) a scheduled first time for the first healthcare session, and
receive, from the first device, a second request to schedule a second healthcare session related to the first healthcare session between the first device and a third device at a second time subsequent to the first time;
determine whether the first device and the third device are located within a threshold distance from each other;
determine, based on the type of the first healthcare session and the scheduled first time, a bandwidth allocation for a first network slice of the 5G telecommunications network required for conducting the first healthcare session;
associate the first network slice with the first device and the second device; and
at the first time of the scheduled first healthcare session, establish a 5G wireless connection between the first device and the second device via the first network slice; and
responsive to determining that the first device and the third device are located within the threshold distance from each other, establish a local area network (LAN) connection between the first device and the third device at the second time.

13. The server system of claim 12,
wherein determining the bandwidth allocation of the first network slice comprises determining a data transmission rate, jitter, packet loss, and/or reliability required for conducting the first healthcare session.

14. The server system of claim 12,
wherein the bandwidth allocation for the first network slice is determined based on one or more attributes of the software application operating on the first device.

15. The server system of claim 12,
wherein the first device is a wireless device associated with a healthcare provider and the second device is a wireless device associated with a patient, and
wherein the type of the first healthcare session is a videoconference between the first device and the second device.

16. A non-transitory, computer-readable storage medium comprising instructions for managing healthcare sessions recorded thereon, wherein the instructions, when executed by at least one data processor of a first device associated with a healthcare provider, cause the first device to:
transmit, from a software application on the first device to a server system associated with a 5G telecommunications network, a first request to schedule a first healthcare session between the first device and a second device associated with the healthcare management system via the 5G telecommunications network,
wherein the first request indicates: (1) a type of the first healthcare session selected from multiple healthcare session types, (2) a scheduled time for the first healthcare session, and transmit from the software application of the first device to the server system, a second request to schedule a second healthcare session related to the first healthcare session between the first device and a third device at a second time subsequent to the first time;

cause the server system to transmit a third request to schedule the first healthcare session to the second device;

responsive to receiving an acceptance of scheduling the first healthcare session from the second device:

cause the server system to determine, based on the type of the first healthcare session and the scheduled time, a bandwidth allocation for a first network slice of the 5G telecommunications network required for conducting the first healthcare session;

cause the server system to associate the first network slice with the first device and the second device;

at the time of the scheduled first healthcare session, cause the server system to establish a 5G wireless connection between the first device and the second device via the first network slice;

cause the server system to determine whether the first device and the third device are located within a threshold distance from each other; and responsive to determining that the first device and the third device are located within the threshold distance from each other, cause the server system to establish a local area network (LAN) connection between the first device and the third device at the second time.

17. The computer-readable storage medium of claim 16, wherein the bandwidth allocation for the first network slice is determined based on one or more attributes of the software application operating on the first device.

18. The computer-readable storage medium of claim 16, wherein the second device is a wireless device associated with a patient, and
wherein the type of the first healthcare session is a videoconference between the first device and the second device.

19. The computer-readable storage medium of claim 16, wherein the second device is associated with a patient, wherein the first device and the second device are augmented reality/virtual reality (AR/VR) devices, and
wherein the type of the first healthcare session is a virtual reality meeting between the first device and the second device.

\* \* \* \* \*